United States Patent
Kim et al.

(10) Patent No.: US 10,700,384 B2
(45) Date of Patent: Jun. 30, 2020

(54) ELECTRODE ASSEMBLY AND METHOD FOR MANUFACTURING THE SAME

(71) Applicant: LG Chem, Ltd., Seoul (KR)

(72) Inventors: Su Hyun Kim, Daejeon (KR); Ji Hyun Kim, Daejeon (KR)

(73) Assignee: LG Chem, Ltd. (KR)

( * ) Notice: Subject to any disclaimer, the term of this patent is extended or adjusted under 35 U.S.C. 154(b) by 109 days.

(21) Appl. No.: 16/067,449

(22) PCT Filed: Nov. 2, 2017

(86) PCT No.: PCT/KR2017/012340
§ 371 (c)(1),
(2) Date: Jun. 29, 2018

(87) PCT Pub. No.: WO2018/084606
PCT Pub. Date: May 11, 2018

(65) Prior Publication Data
US 2019/0027789 A1    Jan. 24, 2019

(30) Foreign Application Priority Data

Nov. 2, 2016  (KR) .................. 10-2016-0145420
Nov. 2, 2017  (KR) .................. 10-2017-0145158

(51) Int. Cl.
*H01M 10/0587*  (2010.01)
*H01M 2/26*     (2006.01)
(Continued)

(52) U.S. Cl.
CPC ....... *H01M 10/0587* (2013.01); *H01M 2/263* (2013.01); *H01M 2/266* (2013.01); *H01M 10/0431* (2013.01); *H01M 10/0525* (2013.01)

(58) Field of Classification Search
CPC ............. H01M 20/0587; H01M 2/266; H01M 2/0587; H01M 2/058
See application file for complete search history.

(56) References Cited

U.S. PATENT DOCUMENTS

| 2002/0061435 A1* | 5/2002 | Hisai ............... H01M 2/263 |
| | | 429/94 |
| 2006/0127751 A1 | 6/2006 | Woo |

(Continued)

FOREIGN PATENT DOCUMENTS

| EP | 1195822 A2 | 4/2002 |
| JP | 2000090977 A | 3/2000 |

(Continued)

OTHER PUBLICATIONS

Search report from International Application No. PCT/KR2017/012340, dated Feb. 12, 2018.

(Continued)

*Primary Examiner* — Matthew J Merkling
(74) *Attorney, Agent, or Firm* — Lerner, David, Littenberg, Krumholz & Mentlik, LLP

(57) ABSTRACT

The present invention relates to an electrode assembly including a multi-tab in which tabs are capable of being aligned and a method for manufacturing the same.

The method for manufacturing an electrode assembly according to the present invention includes a stacking step of repeatedly stacking a negative electrode, a separator, and a positive electrode so that the separator is stacked between the negative electrode including an electrode tab and the positive electrode including an electrode tab to form an electrode stack, an electrode tab coupling step of coupling the electrode tabs having at least two or more same polarities of the electrode tabs of the electrode stack to each other, and a winding step of winding the electrode stack.

20 Claims, 13 Drawing Sheets

(51) Int. Cl.
  *H01M 10/0525*   (2010.01)
  *H01M 10/04*     (2006.01)

(56) References Cited

U.S. PATENT DOCUMENTS

| | | | |
|---|---|---|---|
| 2009/0239133 A1* | 9/2009 | Kosugi | H01M 2/263 |
| | | | 429/94 |
| 2010/0190056 A1* | 7/2010 | Turner | H01M 2/263 |
| | | | 429/211 |
| 2011/0067227 A1 | 3/2011 | Sohn | |
| 2011/0104541 A1 | 5/2011 | Ahn et al. | |
| 2011/0151295 A1 | 6/2011 | Kim | |
| 2012/0279053 A1* | 11/2012 | Kusama | H01M 2/266 |
| | | | 29/623.1 |
| 2014/0050956 A1* | 2/2014 | Huang | H01M 10/0431 |
| | | | 429/94 |
| 2016/0164133 A1* | 6/2016 | Matsumoto | H01M 10/049 |
| | | | 429/179 |
| 2017/0250437 A1* | 8/2017 | Kim | H01M 2/1686 |
| 2017/0365839 A1 | 12/2017 | Kawate | |
| 2018/0026295 A1* | 1/2018 | Lim | H01M 2/14 |
| | | | 320/128 |
| 2018/0040918 A1* | 2/2018 | Guen | H01M 2/1241 |
| 2019/0379028 A1* | 12/2019 | Lim | H01M 10/0587 |

FOREIGN PATENT DOCUMENTS

| | | |
|---|---|---|
| JP | 2014011115 A | 1/2014 |
| KR | 20060059716 A | 6/2006 |
| KR | 101136156 B1 | 4/2012 |
| KR | 101137372 B1 | 4/2012 |
| KR | 20150030537 A | 3/2015 |
| KR | 20150122340 A | 11/2015 |
| WO | 2016093338 A1 | 6/2016 |

OTHER PUBLICATIONS

Extended European Search Report including Written Opinion for Application No. EP17867461.0, dated Oct. 7, 2019, pp. 1-6.

\* cited by examiner

ELECTRODE ASSEMBLY AND METHOD FOR MANUFACTURING THE SAME

CROSS-REFERENCE TO RELATED APPLICATION

The present application is a national phase entry under 35 U.S.C. § 371 of International Application No. PCT/KR2017/012340 filed on Nov. 2, 2017, which claims priority from Korean Patent Application No. 10-2016-0145420, filed on Nov. 2, 2016, and Korean Patent Application No. 10-2017-0145158, filed on Nov. 2, 2017, which are hereby incorporated by reference in their entirety.

TECHNICAL FIELD

The present invention relates to an electrode assembly and a method for manufacturing the same, and more particularly, to an electrode assembly including a multi-tab in which tabs are capable of being aligned and a method for manufacturing the same.

BACKGROUND ART

Lithium secondary batteries may be divided into lithium metal batteries, lithium ion batteries, and lithium secondary batteries according to a shape of an electrolyte.

Here, such a lithium secondary battery may not require a firm metal exterior and be manufactured in various sizes and shapes according to a use thereof. For example, the lithium secondary battery may have a thickness of 3 mm or less and a weight that is reduced by 30% or more. Thus, the lithium secondary battery may be mass-produced and manufactured as a large-scale battery.

For this reason, the lithium secondary battery has been commercialized at present and is being used in various fields.

A secondary battery and a method for manufacturing the same are disclosed in Korean Patent Registration No. 10-1136156.

An electrode assembly according to a related art is manufactured by respectively attaching terminals (or electrode tabs) to non-coating portions of a positive electrode plate and a negative electrode plate, which are wound, after the positive electrode plate, the negative electrode plate, and a separator are wound.

However, a method for manufacturing the electrode assembly has a problem in which it is difficult to align electrode tabs in case of a multi-tab including a plurality of tabs because terminals (the electrode tabs) are attached to non-coating portions of a positive electrode plate and a negative electrode plate, which are wound.

Also, if the electrode tabs are not constantly aligned, an electron movement route may be changed to cause kinetic balance that is one of causes of cycle degeneration.

DISCLOSURE OF THE INVENTION

Technical Problem

Therefore, the present invention has been made to solve the abovementioned problem, and an object of the prevent invention is to provide a secondary battery in which electrode tabs are capable of being stably aligned and a method for manufacturing the same.

Technical Solution

A method for manufacturing an electrode assembly according to the present invention includes a stacking step of repeatedly stacking a negative electrode, a separator, and a positive electrode so that the separator is stacked between the negative electrode including an electrode tab and the positive electrode including an electrode tab to form an electrode stack, an electrode tab coupling step of coupling the electrode tabs having at least two or more same polarities of the electrode tabs of the electrode stack to each other, and a winding step of winding the electrode stack.

The electrode tabs may include a negative electrode tab formed on the negative electrode and a positive electrode tab formed on the positive electrode, in the stacking step, each of the negative electrode, the separator, and the positive electrodes may be provided in plurality, and the plurality of negative electrodes, the plurality of separators, and the plurality of positive electrodes may be stacked, wherein the negative electrode tabs formed on the plurality of negative electrodes may be stacked on each other, and the positive electrode tabs formed on the plurality of positive electrodes may be stacked on each other, and in the electrode tab coupling step, the positive electrode tabs may be coupled to each other, and the negative electrode tabs may be coupled to each other.

The electrode tabs may include a negative electrode tab formed on the negative electrode and a positive electrode tab formed on the positive electrode, in the stacking step, each of the negative electrode, the separator, and the positive electrodes may be provided in plurality, and the plurality of negative electrodes, the plurality of separators, and the plurality of positive electrodes may be stacked, wherein the negative electrode tabs formed on the plurality of negative electrodes may be stacked on each other, and the positive electrode tabs formed on the plurality of positive electrodes may be stacked on each other, and in the electrode tab coupling step, the positive electrode tabs may be coupled to each other, and the negative electrode tabs may not be coupled to each other.

After the winding step, the negative electrode tab formed on each of the plurality of negative electrodes may be bent in a central direction of the electrode stack to stack ends of the negative electrode tab on each other.

The stacked ends of the negative electrode tab may be coupled to each other in a central axis direction of the electrode stack.

The stacking step, the electrode tab coupling step, and the winding step may be sequentially performed.

The electrode tabs may include a negative electrode tab formed on the negative electrode and a positive electrode tab formed on the positive electrode, and in the stacking step, each of the negative electrode, the separator, and the positive electrodes may be provided in plurality, and the plurality of negative electrodes, the plurality of separators, and the plurality of positive electrodes may be stacked, wherein the positive electrode tabs of plurality of the positive electrodes may be disposed on the same vertical line, and the negative electrode tabs of the plurality of negative electrodes may be disposed to be gradually close to the positive electrode tabs in a stacked direction of the negative electrodes.

In the stacking step, the positive electrode tabs formed on the plurality of positive electrodes may be stacked on each other, and in the electrode tab coupling step, the positive electrode tabs may be coupled to each other, and the negative electrode tabs may not be coupled to each other.

The plurality of negative electrode tabs, which are disposed to be spaced apart from each other, may be disposed to overlap each other on the same vertical line after being wound in the winding step.

In the winding step, the electrode stack may be wound so that the negative electrode on which the negative electrode tab that is close to the positive electrode tab is formed is disposed at the inside in the wound direction of the electrode stack.

In the winding step, the plurality of negative electrode tabs may be stacked to overlap each other on the same vertical line.

After the winding step, the negative electrode tabs respectively formed on the plurality of negative electrodes may be stacked to be coupled to each other.

Ends of the negative electrode tabs that are stacked to be coupled to each other may be bent in a central direction of the electrode stack.

The plurality of negative electrode tabs spaced apart from each other may be disposed at the same distance with respect to a central axis of the electrode stack wound in the winding step (S3), in the winding step (S3), the negative electrode tabs respectivley formed on the plurality of negative electrodes may be disposed at the same distance with respect to the central axis of the wound electrode stack, and after the winding step (S3), the negative electrode tab may be bent in a central direction of the wound electrode stack, and ends of the bent negative electrode tab are stacked to be coupled to each other.

An electrode assembly according to the present invention includes an electrode-assembled body in which a positive electrode, a separator, and a negative electrode are repeatedly stacked and wound and an electrode tab bundle in which electrode tabs having at least one same polarity of electrode tabs of electrode tabs of the negative electrode and electrode tabs of the positive electrode, which are stacked in the electrode-assembled body, are coupled to each other.

The electrode tab bundle may include one or more electrode tab bundles of a negative electrode tab bundle in which negative electrode tabs disposed on a plurality of negative electrodes stacked in the electrode-assembled body are stacked to be coupled to each other and a positive electrode tab bundle in which positive electrode tabs disposed on a plurality of positive electrodes stacked in the electrode-assembled body are stacked to be coupled to each other.

The electrode tab bundle may include a negative electrode tab bundle in which negative electrode tabs disposed on a plurality of negative electrodes stacked in the electrode-assembled body are bent in a central direction of the electrode-assembled body and coupled to each other and a positive electrode tab bundle in which positive electrode tabs disposed on a plurality of positive electrodes stacked in the electrode-assembled body are stacked to be coupled to each other.

The negative electrode tabs disposed on the plurality of negative electrodes may be spaced the same distance from each other in the state in which the electrode-assembled body is wound.

The electrode tabs of the plurality of positive electrodes stacked in the electrode-assembled body may be disposed on the same vertical line, the electrode tabs of the plurality of negative electrodes stacked in the electrode-assembled body may be gradually close to the electrode tabs of the positive electrodes in a stacked direction of the plurality of negative electrodes, and ends of the electrode tab of each of the negative electrodes may be bent to overlap each other at a central portion of the electrode-assembled body.

The electrode assembly may further include a positive electrode tab bundle in which the electrode tabs of the plurality of positive electrode stacked on the same vertical line in the electrode-assembled body are stacked to be coupled to each other.

Advantageous Effects

According to the present invention, since the electrode tabs are aligned to be coupled to each other before the positive electrode, the negative electrode, and the separator are wound, the aligned state of the electrode tabs may be evenly maintained even after the electrode assembly is wound to be assembled.

According to the present invention, the electrode tabs may be evenly aligned to provide the constant movement route of the electrons.

According to the present invention, the movement route of the electrons may be constant to uniformly maintain the kinetic balance, thereby improving the cycle properties.

According to the present invention, the wound electrode assembly may be prevented from being wrinkled.

According to the present invention, the electrode assembly may be prevented from increasing in size by the negative electrode tab.

According to the present invention, the charging efficiency of the secondary battery may be maximized.

MODE FOR CARRYING OUT THE INVENTION

Figure 1:
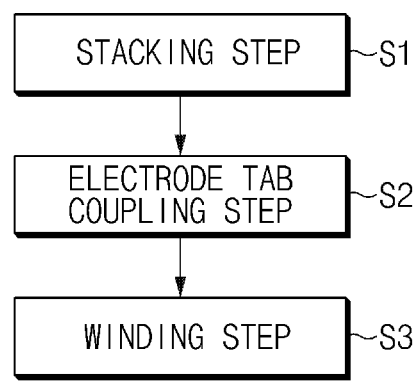
FIG. 1 is a flowchart illustrating a method for manufacturing an electrode assembly according to Embodiment 1 of the present invention.

Hereinafter, a secondary battery and a method for manufacturing the same according to preferred embodiments of the present invention will be described in detail with reference to the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

FIG. 1 is a flowchart illustrating a method for manufacturing an electrode assembly according to Embodiment 1 of the present invention.

As illustrated in FIG. 1, a method for manufacturing an electrode assembly according to Embodiment 1 of the present invention includes a stacking step (S1), an electrode tab coupling step (S2), and a winding step (S3).

Figure 2:
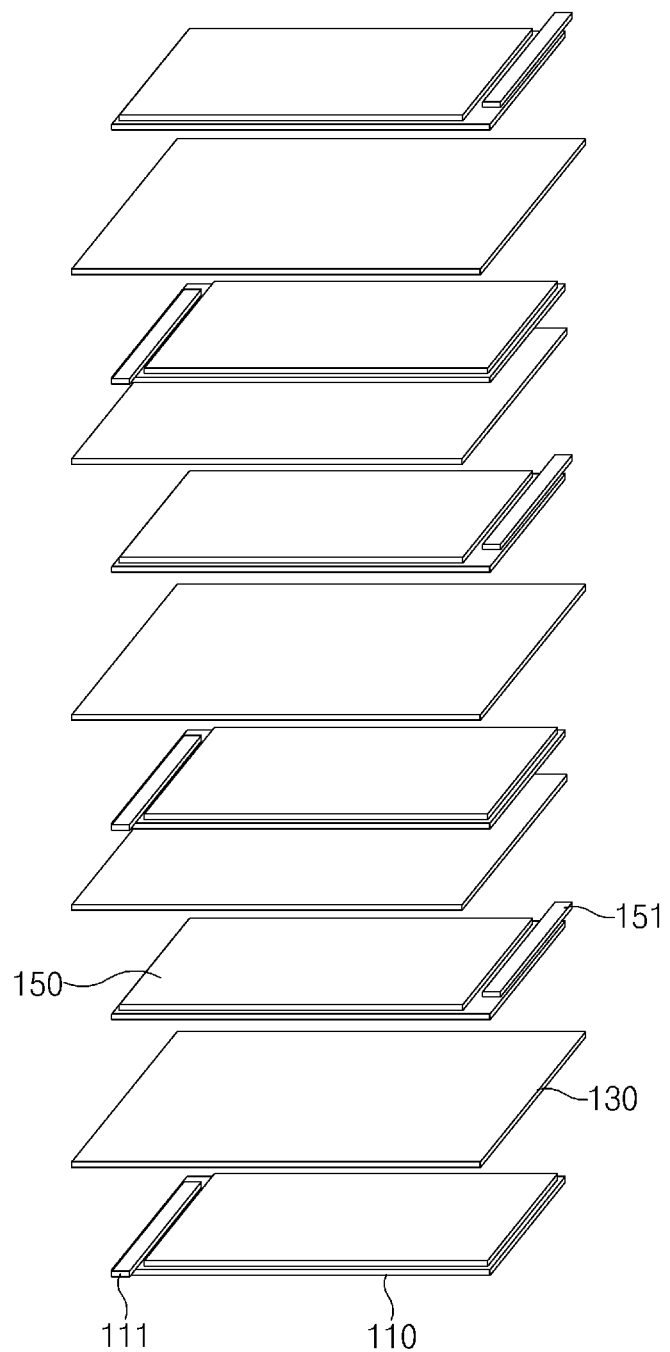
FIG. 2 is an exploded perspective view of the electrode assembly according to Embodiment 1 of the present invention.
Figure 3:
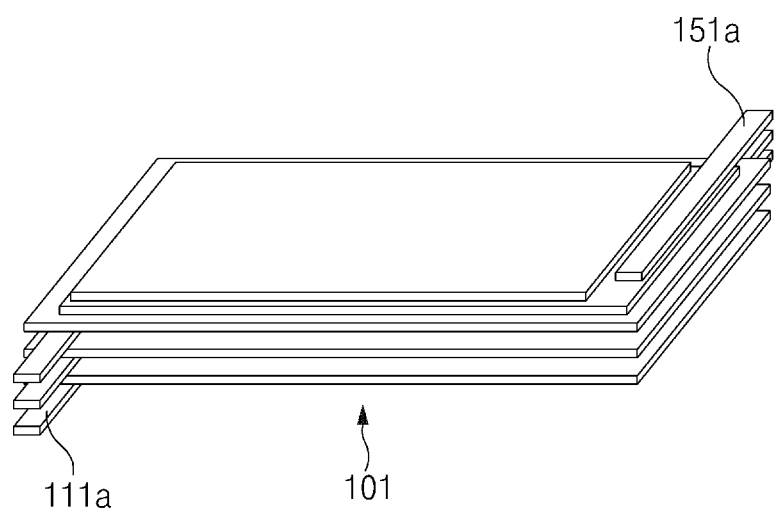
FIG. 3 is a perspective view illustrating a stacked state of the electrode assembly of FIG. 2.

FIG. 2 is an exploded perspective view of the electrode assembly according to Embodiment 1 of the present invention, and FIG. 3 is a perspective view illustrating a stacked state of the electrode assembly of FIG. 2.

As illustrated in FIGS. 2 and 3, the stacking step (S1) according to Embodiment 1 of the present invention is a step of forming an electrode stack 101 by repeatedly stacking each of a plurality of negative electrodes 110, each of a plurality of separators 130, and each of a plurality of positive electrodes 150 so that the separator 130 is stacked between the negative electrode 110 including an electrode tab and the positive electrode 150 including an electrode tab.

The positive electrode 150 may be an aluminum plate and include a positive electrode active material portion coated with a positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode active material portion may be formed, for example, by applying the positive electrode active material to a portion of at least one surface of the aluminum plate, and the remaining portion of the aluminum plate, which is not coated with the positive electrode active material, may be the positive electrode non-coating portion.

The positive electrode tab 151 is electrically connected to the positive electrode non-coating portion.

The negative electrode 110 may be a copper plate and include a negative electrode active material portion coated with a negative electrode active material and a negative electrode non-coating portion which is not coated with the negative electrode active material.

The negative electrode active material may be a carbon material such as crystalline carbon, amorphous carbon, a carbon composite, and a carbon fiber, a lithium metal, or a lithium alloy.

The negative electrode active material portion may be formed, for example, by applying the negative electrode active material to a portion of at least one surface of the copper plate, and the remaining portion of the copper plate, which is not coated with the negative electrode active material, may be the negative electrode non-coating portion.

The negative electrode tab 111 is electrically connected to the negative electrode non-coating portion.

The separator 130 may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

In the negative electrode tabs 111 respectively formed on the plurality of negative electrodes 110, the negative electrode tabs 111 may be stacked on each other. In the positive electrode tabs 151 respectively formed on the plurality of positive electrodes 150, the positive electrode tabs 151 may be stacked on each other.

The electrode tab coupling step (S2) according to Embodiment 1 of the present invention is a step of coupling the electrode tabs having at least one same polarity of the electrode tabs respectively connected to the electrodes stacked in the electrode stack 101 to each other.

That is, the electrode tab coupling step (S2) is a step in which the positive electrode tabs 151, which are electrically connected to the positive electrodes 150, of the electrodes stacked in the electrode stack 101 are coupled to each other, or the negative electrode tabs 111, which are electrically connected to the negative electrodes 110, of the electrodes stacked in the electrode stack 101 are coupled to each other.

Alternatively, in the electrode tab coupling step (S2), the positive electrode tabs 151, which are electrically connected to the positive electrodes 150, of the electrodes stacked in the electrode stack 101 may be coupled to each other, and also, the negative electrode tabs 111, which are electrically connected to the negative electrodes 110, of the electrodes stacked in the electrode stack 101 may be coupled to each other.

Also, each of the negative electrode tabs 111 and each of the positive electrode tabs 151 may be coupled to each other through welding.

Figure 4:
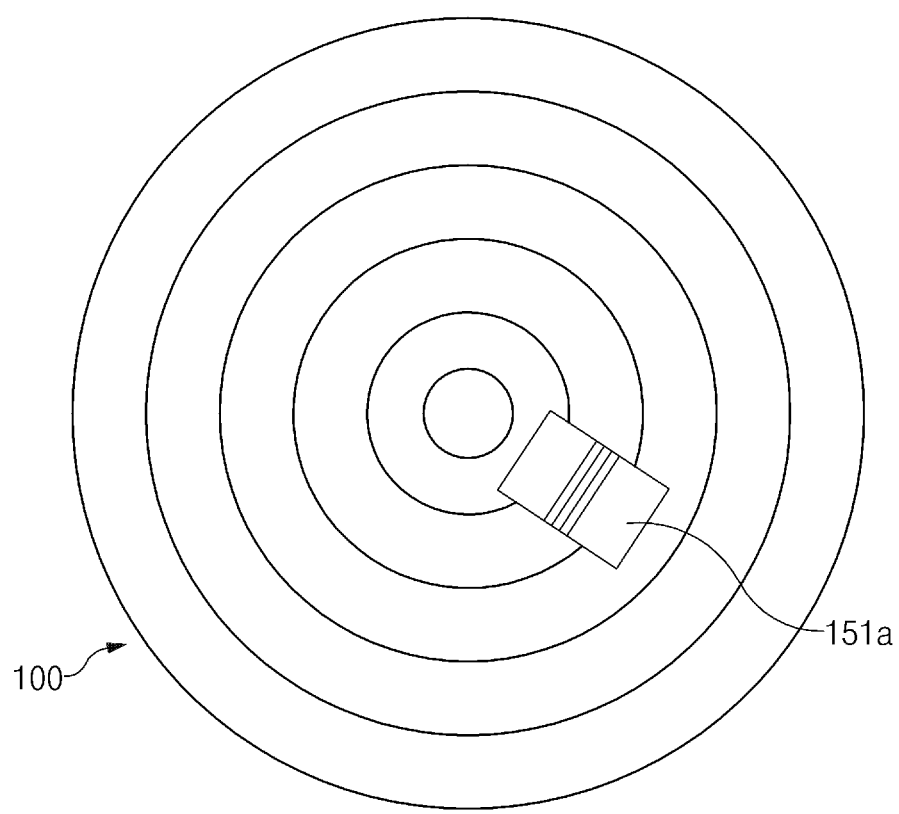
FIG. 4 is a plan view of a positive electrode tab bundle according to Embodiment 1 of the present invention.
Figure 5:
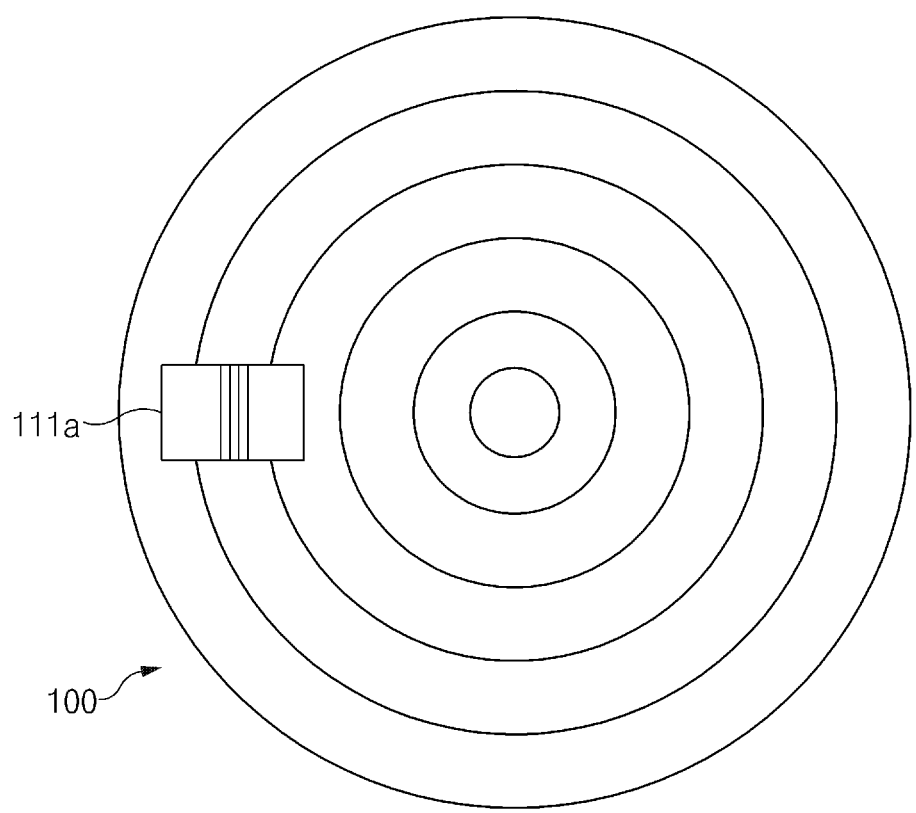
FIG. 5 is a bottom view of a negative electrode tab bundle according to Embodiment 1 of the present invention.

FIG. 4 is a plan view of a positive electrode tab bundle according to Embodiment 1 of the present invention, and FIG. 5 is a bottom view of a negative electrode tab bundle according to Embodiment 1 of the present invention.

As illustrated in FIGS. 4 and 5, the winding step (S3) according to Embodiment 1 of the present invention is a step of forming an electrode-assembled body 100 having a jelly-roll shape by winding the electrode stack 101 in which the electrode tabs having at least one same polarity are coupled to each other.

Since the positive electrode tabs 151 are disposed at a central side of the wound electrode-assembled body 100 when compared to the negative electrode tabs 111, when the electrode stack 101 is wound in the winding step (S3) after the positive electrode tabs 151 are coupled to each other in the electrode tab coupling step (S2), and then, the electrode tabs 111 are coupled to each other after the winding step (S3), the electrode assembly may be easily manufactured, and also, the electrode tabs of the electrode-assembled body 100 may be evenly aligned.

Also, since the positive electrode tabs 151 are coupled to each other, and the negative electrode tabs 111 are coupled to each other in the electrode tab coupling step (S2), and then, the electrode stack 101 is wound in the winding step (S3) to manufacture the electrode-assembled body 100, all of the positive electrode tabs 151 and the negative electrode tabs 111 may be evenly aligned.

Figure 6:
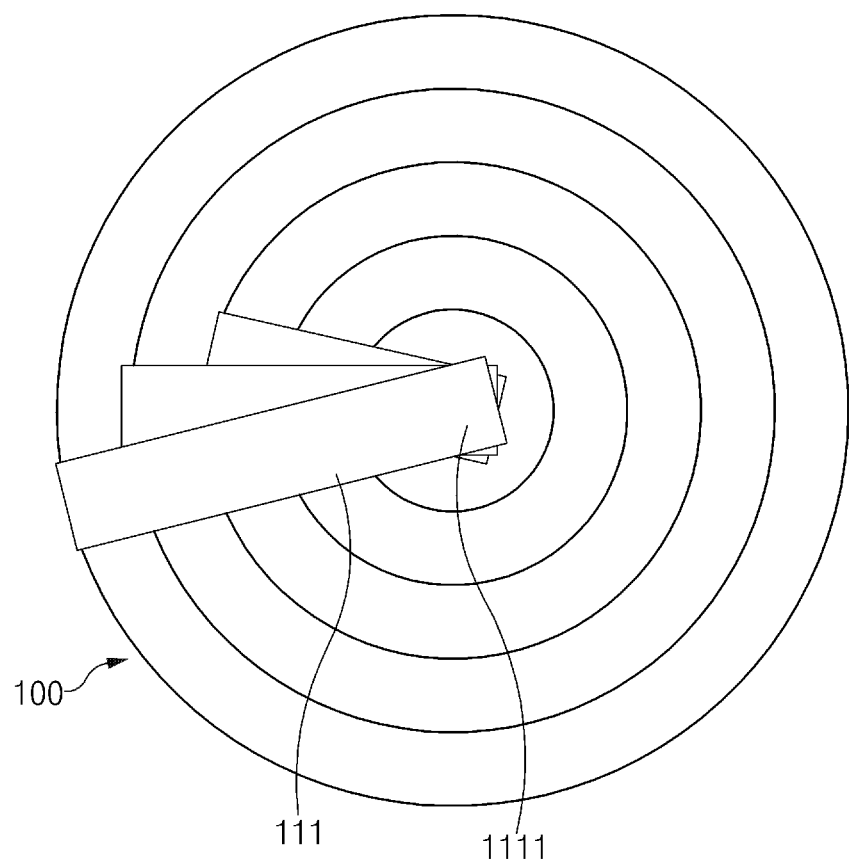
FIG. 6 is a bottom view of a negative electrode tab bundle according to Embodiment 2 of the present invention.

FIG. 6 is a bottom view of a negative electrode tab bundle according to Embodiment 2 of the present invention.

As illustrated in FIG. 6, in a stacking step (S1) according to Embodiment 2 of the present invention, a plurality of negative electrodes, a plurality of separators, and a plurality of positive electrodes may be stacked. Here, electrode tabs 111 formed on the plurality of negative electrodes may be stacked on each other, and positive electrode tabs 151 formed on the plurality of positive electrodes may be stacked on each other.

Also, in an electrode tab coupling step (S2) according to Embodiment 2 of the present invention, the stacked positive electrode tabs 151 may be coupled to each other through welding, and the stacked negative electrode tabs 111 may not be coupled to each other.

In a winding step (S3) according to Embodiment 2 of the present invention, an electrode stack 101 may be wound in the state in which the positive electrode tabs 151 are coupled to each other through the welding, and the stacked negative electrode tabs 111 are not coupled to each other.

Also, after the winding step (S3), the plurality of negative electrode tabs 111 of an electrode-assembled body 100 formed by winding the electrode stack 101 may be bent in a central direction of the electrode-assembled body 100 to stack ends 1111 of the plurality of negative electrode tabs 111 on each other. The ends 1111 of the stacked negative electrode tabs 111 may be coupled to each other through the welding in a central axis direction of the electrode-assembled body 100.

A method for manufacturing an electrode assembly according to Embodiment 2 of the present invention may be one of methods in which the electrode stack 101 is wound to form the electrode-assembled body 100 in the state in which the positive electrode tabs 151 are coupled to each other through the welding, and the negative electrode tabs 111 are not coupled to each other, and the negative electrode tabs 111 are coupled to each other after the electrode-assembled body 100 is formed.

In the method for manufacturing the electrode assembly according to Embodiment 2 of the present invention, the negative electrode tabs 111 disposed at the outside in the wound direction of the electrode-assembled body 100 may be coupled to each other after the winding step (S3) to prevent wrinkles (so-called a wrinkle phenomenon) from being generated in the step of winding the electrode stack 101, and also, the positive electrode tabs 151 disposed at the inside in the wound direction of the electrode-assembled body 100 may be coupled to each other before the winding step (S3) to evenly align the electrode tabs and thereby match kinetic balance. Also, in this case, since a matching portion of the negative electrode tabs 111 exists on the ends 1111 of the negative electrode tabs 111, an effect of the matching the kinetic balance may also be realized somewhat at the negative electrode tabs 111.

Figure 7:
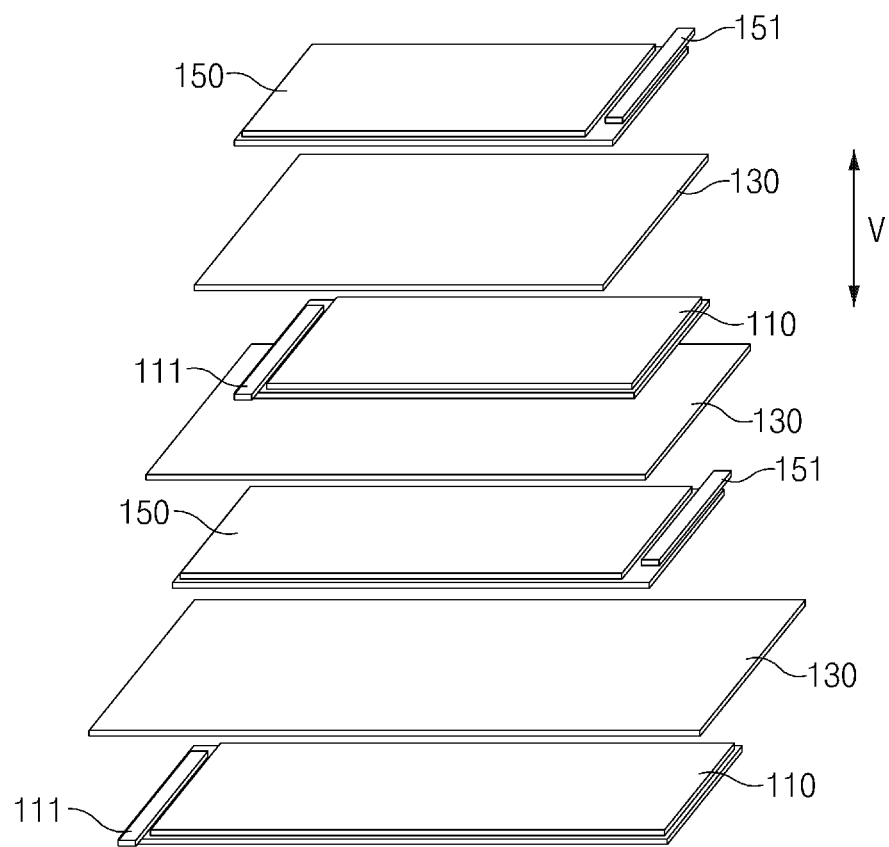
FIG. 7 is an exploded perspective view of an electrode assembly according to Embodiment 3 of the present invention.
Figure 8:
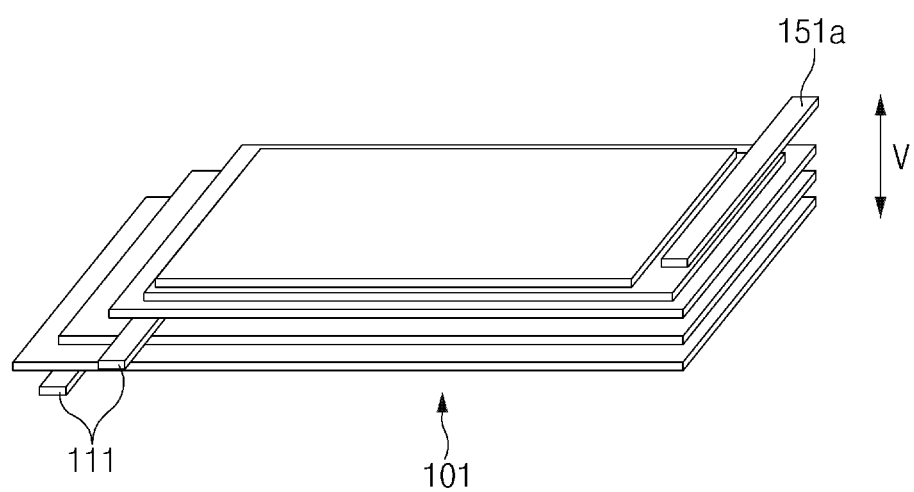
FIG. 8 is a perspective view illustrating a stacked state of the electrode assembly of FIG. 7.
Figure 9:
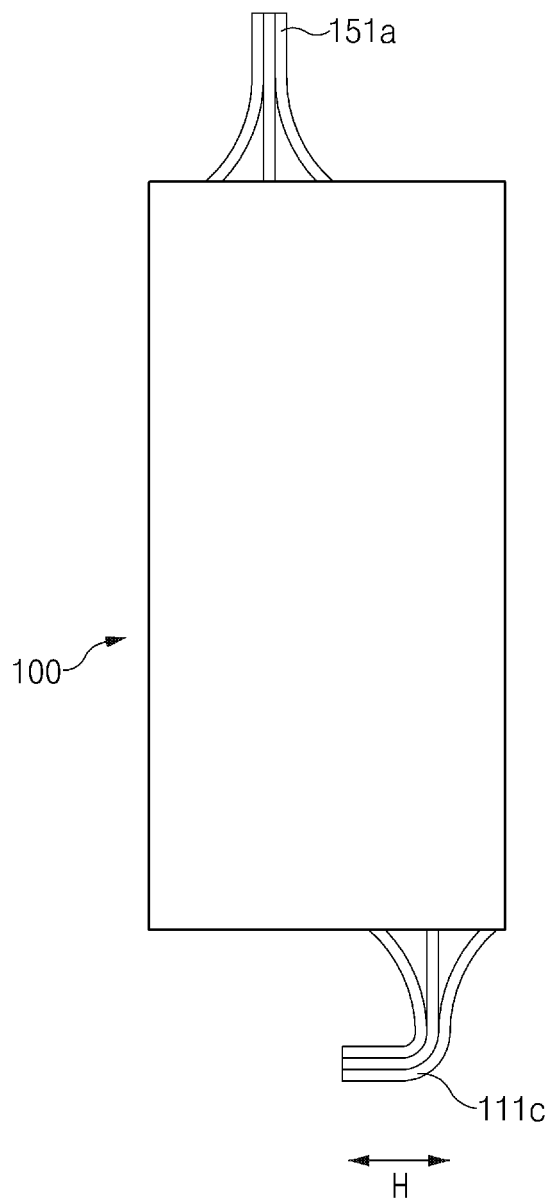
FIG. 9 is a front view illustrating a wound state of the electrode assembly of FIG. 8.

FIG. 7 is an exploded perspective view of an electrode assembly according to Embodiment 3 of the present invention, FIG. 8 is a perspective view illustrating a stacked state of the electrode assembly of FIG. 7, and FIG. 9 is a front view illustrating a wound state of the electrode assembly of FIG. 8.

As illustrated in FIGS. 7 to 9, in a stacking step (S1) of a method for manufacturing an electrode assembly according to Embodiment 3 of the present invention, positive electrode tabs 151 of a plurality of positive electrodes are disposed on the same vertical line V and stacked on each other, and negative electrode tabs 111 of a plurality of negative electrodes are formed to be gradually close to the positive electrode tabs in a stacked direction of the negative electrodes.

Here, the negative electrode tabs 111 may be disposed to overlap each other on the same vertical line H after being wound in the winding step (S3) (see FIG. 9).

In an electrode tab coupling step (S2), the positive electrode tabs 151, which are stacked on each other, may be coupled to each other, but the negative electrode tabs 111 may not be coupled to each other.

In a winding step (S3), when an electrode stack 101 is wound so that the positive electrode tabs 151 are disposed at a central side in the wound direction of the electrode stack 101, the negative electrode tabs 111 of the wound electrode stack 101 may be in a state of overlapping each other on the same vertical line. Here, the plurality of negative electrode tabs 111 may be disposed at the outside in the wound direction of an electrode-assembled body 100 in an order from the shortest distance to the farthest distance with respect to the positive electrode tabs 151.

Also, after the winding step (S3), the negative electrode tabs 111, which are disposed to overlap each other on the same vertical line H, may be stacked on each other and then coupled to each other through welding.

Also, ends of the negative electrode tabs 111, which are coupled to each other, may be bent in the central direction of the electrode-assembled body 100 to minimize an increase in volume of the electrode-assembled body 100.

Figure 10:
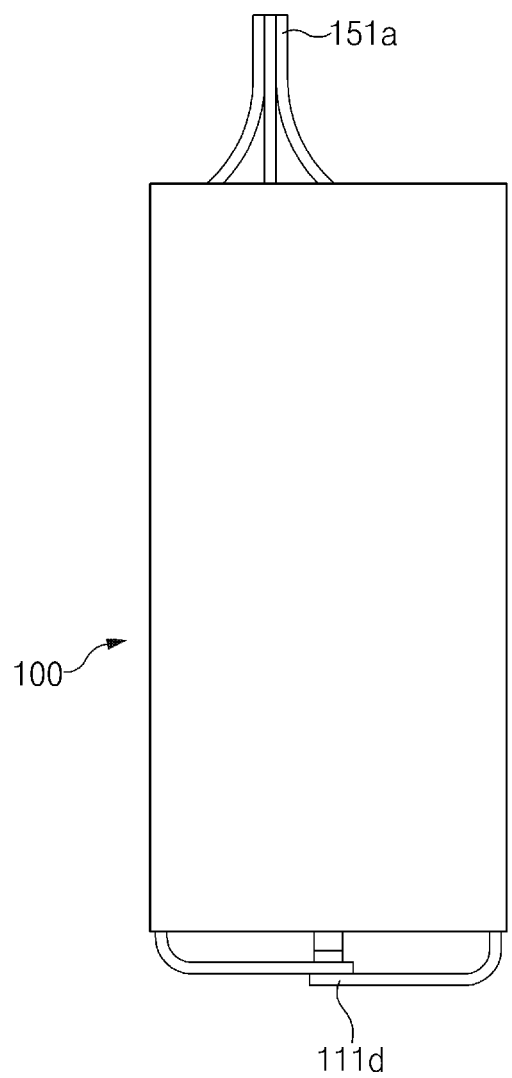
FIG. 10 is a front view illustrating a wound state of an electrode assembly according to Embodiment 4 of the present invention.
Figure 11:
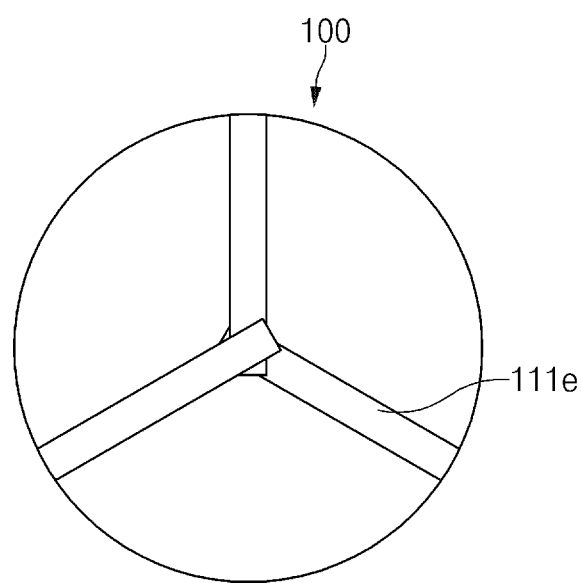
FIG. 11 is a bottom view of FIG. 10.
Figure 12:
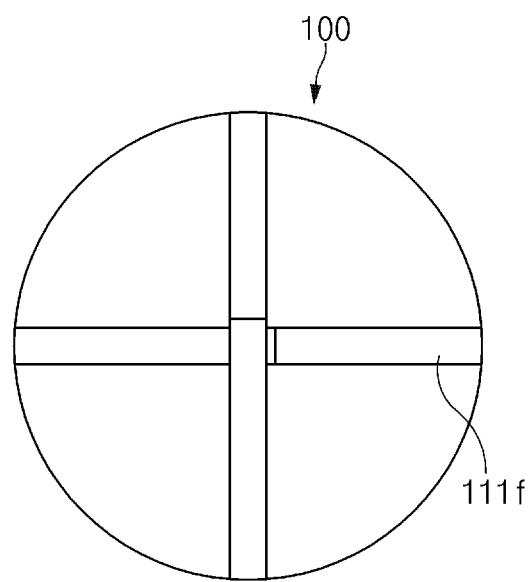
FIG. 12 is a bottom view illustrating a bottom surface of a wound electrode assembly according to Embodiment 5 of the present invention.

FIG. 10 is a front view illustrating a wound state of an electrode assembly according to Embodiment 4 of the present invention, FIG. 11 is a bottom view of FIG. 10, and FIG. 12 is a bottom view illustrating a bottom surface of a wound electrode assembly according to Embodiment 5 of the present invention.

As illustrated in FIGS. 11 and 12, in methods for manufacturing an electrode assembly according to Embodiments 4 and 5 of the present invention, a positive electrode tabs 151 of a plurality of positive electrodes may be stacked on each other on the same vertical line V in a stacking step (S1), and negative electrode tabs 111 of a plurality of negative electrodes may be formed to be gradually close to the positive electrode tabs 151 in the stacked direction of the negative electrodes. Here, the plurality of negative electrode tabs, which are disposed to be spaced apart from each other, may be disposed at the same distance with respect to a central axis of the electrode stack 101, which are wound in the winding step (S3).

As a result, when the electrode stack 101 is wound in the winding step (S3), the negative electrode tabs 111 respectively formed on the plurality of negative electrodes may be disposed at the same distance with respect to the central axis of the electrode-assembled body 100, which is the wound electrode stack 101.

Also, after the winding step (S3), the negative electrode tabs 111 disposed at the same distance may be bent in the central direction of the electrode-assembled body 100, and ends of the bent negative electrode tabs 111 may be stacked on each other and then coupled to each other through welding. Here, the negative electrode tabs 111 disposed at the same distance may have a shape such as a radial shape (see FIG. 11) or a cross shape (see FIG. 12) when viewed from a bottom surface of the electrode-assembled body 100 according to the number of negative electrode tabs 111.

The above-described stacking step (S1), the electrode tab coupling step (S2), and the winding step (S3) may be sequentially performed.

An electrode assembly according to various embodiments will be described in detail with reference to the accompanying drawings.

As illustrated in FIGS. 2 to 5, the electrode assembly according to Embodiment 1 of the present invention includes an electrode tab bundle in which the negative electrode 110, the separator 130, and the positive electrode 150 are repeatedly stacked and wound, and the electrode tabs having at least one same polarity of the electrode tabs of the negative electrodes 110 and the electrode tabs of the positive electrodes 150, which are stacked in the electrode-assembled body 100 may be coupled to each other.

The electrode tab bundle according to Embodiment 1 may include a negative electrode tab bundle 111a in which the negative electrode tabs 111 formed on the plurality of negative electrodes 110 stacked in the electrode-assembled body 100 are stacked to be coupled to each other or a positive electrode tab bundle 151a formed on the plurality of positive electrodes 150 stacked in the electrode-assembled body 100 are stacked to be coupled to each other.

As described above, in the electrode assembly according to Embodiment 1 of the present invention, since the electrode tabs having the same polarity of the plurality of negative electrode tabs 111 or the plurality of positive electrode tabs 151 are evenly stacked and coupled to each other through the welding, a movement route of electrons may be the same to match the kinetic balance, thereby improving the cycle properties of the secondary battery.

As illustrated in FIG. 6, in the electrode assembly according to Embodiment 2 of the present invention, the electrode tabs of the negative electrodes 110 stacked in the electrode-assembled body 100 after the winding may be slightly dislocated while being wound. However, the ends 1111 of the negative electrode tabs may match each other through the bending.

Also, the electrode tab bundle may include a positive electrode tab bundle 151a in which the positive electrode tabs 151, which are formed on the plurality of positive electrodes 150 stacked in the electrode-assembled body 100 together with the ends 1111 of the negative electrode tabs which are formed on the plurality of negative electrodes 110 stacked in the electrode-assembled body 100 and stacked on each other, are stacked on the same line and coupled to each other.

As described above, in the electrode assembly according to Embodiment 2 of the present invention, since the electrode tabs having the same polarity of the plurality of negative electrode tabs 111 and the plurality of positive electrode tabs 151 are evenly stacked and coupled to each other through the welding, the movement route of electrons may be the same to match the kinetic balance, thereby improving the cycle properties of the secondary battery.

When the electrode-assembled body 100 is installed in a can member, the negative electrode tabs 111 may come into contact with a bottom surface of the can member. Thus, when the negative electrode tabs 111 are vertically disposed on the bottom surface of the can member, an inner space of the can member may be excessively occupied to reduce capacity of the secondary battery.

Thus, in the electrode assembly according to Embodiment 2 of the present invention, the ends of the negative electrode tabs 111 may be bent in the central direction of the electrode-assembled body 100 to minimize the installation space of the negative electrode tabs 111.

As illustrated in FIGS. 7 and 8, in the electrode assembly according to Embodiment 3 of the present invention, the negative electrode 110, the separator 130, and the positive electrode 150 may be repeatedly stacked to be wound. Here, the positive electrode tabs 151 formed on the plurality of positive electrodes 150 stacked in the electrode-assembled body 100 may be wound in a state of being stacked on the same vertical line and coupled to each other, and the negative electrode tabs 111 of the plurality of negative electrodes 110 stacked in the electrode-assembled body 100 may be disposed to be gradually close to the positive electrode tabs 151 in the stacked direction of the plurality of negative electrodes 110.

That is, the electrode-assembled body 100 may be wound in the state in which the plurality of positive electrode tabs 151 are stacked on each other before the electrode-assembled body 100 is wound and then coupled to each other the welding, and the plurality of negative electrode tabs 111 may be coupled to each other through the welding by stacking the ends of the plurality of negative electrode tabs 111 on each other in the state in which the plurality of negative electrode tabs 111 are spaced apart from each other after the electrode-assembled body 100 is wound.

As illustrated in FIG. 9, in the electrode assembly according to Embodiment 3 of the present invention, the plurality of positive electrode tabs 151 may be stacked on the same vertical line and coupled to each other before the electrode-assembled body 100 is wound to form a positive electrode tab bundle 151a, and the plurality of negative electrode tabs 111 may be stacked on the same vertical line and coupled to each other after the electrode-assembled body 100 is wound to form a negative electrode tab bundle 111c.

Also, the ends of the negative electrode tab bundle 111c may be bent in the central direction of the electrode-assembled body 100 to minimize the installation space in the can member.

As illustrated in FIGS. 10 to 12, in the electrode assembly according to Embodiments 4 and 5 of the present invention, the plurality of positive electrode tabs 151 may be stacked on the same vertical line and coupled to each other before the electrode-assembled body 100 is wound to form a positive electrode tab bundle 151a, and the plurality of negative electrode tabs 111 may be spaced the same distance from each other with respect to the central portion of the electrode-assembled body 100 after the electrode-assembled body 100 is wound. Also, the plurality of negative electrode tabs 111, which are spaced apart from each other, may be bent to the central portion of the electrode-assembled body 100, and the ends of the negative electrode tabs 111 may be stacked to be coupled to each other through the welding to form a negative electrode tab bundle 111d.

The negative electrode tab bundle 111 may have various shapes such as a radial negative electrode tab bundle 111e (see FIG. 11) and a cross negative electrode tab bundle 111f (see FIG. 12) according to the number of negative electrode tabs 111.

Figure 13:
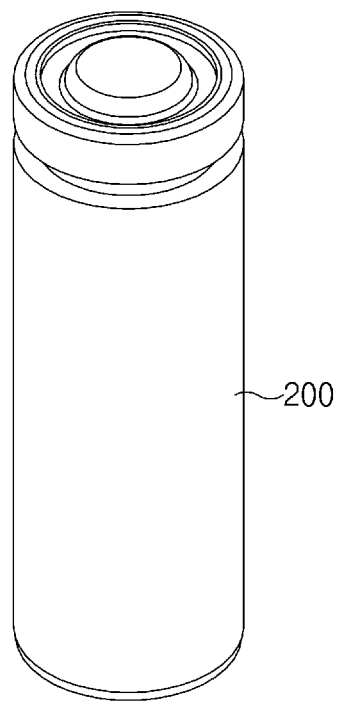
FIG. 13 is a perspective view of a secondary battery in which an electrode assembly is accommodated according to various embodiments of the present invention.

FIG. 13 is a perspective view of a secondary battery in which an electrode assembly is accommodated according to various embodiments of the present invention.

As illustrated in FIG. 13, an electrode assembly according to various embodiments of the present invention may be accommodated in a can member 200 to form the secondary battery.

Also, the secondary battery in which the electrode assembly having the improved cycle properties according to the various embodiments of the present invention is installed may be maximized in charging efficiency.

As described above, according to the present invention, since the electrode tabs are aligned to be coupled to each other before the positive electrode, the negative electrode, and the separator are wound, the aligned state of the electrode tabs may be neatly maintained even after the electrode assembly is wound to be assembled.

According to the present invention, the electrode tabs may be neatly aligned to provide the constant movement route of the electrons.

According to the present invention, the movement route of the electrons may be constant to uniformly maintain the kinetic balance, thereby improving the cycle properties.

According to the present invention, the wound electrode assembly may be prevented from being wrinkled.

According to the present invention, the electrode assembly may be prevented from increasing in size by the negative electrode tab.

According to the present invention, the charging efficiency of the secondary battery may be maximized.

Although the electrode assembly and the method for manufacturing the same according to the present invention has been described above with reference to the exemplary drawings, various changes and modifications may be made thereto by one skilled in the art without departing from the scope and spirit of the invention as set forth in the appended claims.

The invention claimed is:

1. A method for manufacturing an electrode assembly, the method comprising:
 a stacking step (S1) of repeatedly stacking a negative electrode, a separator, and a positive electrode so that the separator is stacked between the negative electrode comprising an electrode tab and the positive electrode comprising an electrode tab to form an electrode stack;
 an electrode tab coupling step (S2) of coupling the electrode tabs having at least two or more same polarities of the electrode tabs of the electrode stack to each other; and
 a winding step (S3) of winding the electrode stack.

2. The method of claim 1, wherein the electrode tabs comprise a negative electrode tab formed on the negative electrode and a positive electrode tab formed on the positive electrode,
 in the stacking step (S1), each of the negative electrode, the separator, and the positive electrodes is provided in plurality, and the plurality of negative electrodes, the plurality of separators, and the plurality of positive electrodes are stacked, wherein the negative electrode tabs formed on the plurality of negative electrodes are stacked on each other, and the positive electrode tabs formed on the plurality of positive electrodes are stacked on each other, and
 in the electrode tab coupling step (S2), the positive electrode tabs are coupled to each other, and the negative electrode tabs are coupled to each other.

3. The method of claim 1, wherein the electrode tabs comprise a negative electrode tab formed on the negative electrode and a positive electrode tab formed on the positive electrode,
 in the stacking step (S1), each of the negative electrode, the separator, and the positive electrodes is provided in plurality, and the plurality of negative electrodes, the plurality of separators, and the plurality of positive electrodes are stacked, wherein the negative electrode tabs formed on the plurality of negative electrodes are stacked on each other, and the positive electrode tabs formed on the plurality of positive electrodes are stacked on each other, and
 in the electrode tab coupling step (S2), the positive electrode tabs are coupled to each other, and the negative electrode tabs are not coupled to each other.

4. The method of claim 3, wherein, after the winding step (S3), the negative electrode tab formed on each of the plurality of negative electrodes is bent in a central direction of the electrode stack to stack ends of the negative electrode tab on each other.

5. The method of claim 4, wherein the stacked ends of the negative electrode tab are coupled to each other in a central axis direction of the electrode stack.

6. The method of claim 1, wherein the stacking step (S1), the electrode tab coupling step (S2), and the winding step (S3) are sequentially performed.

7. The method of claim 1, wherein the electrode tabs comprise a negative electrode tab formed on the negative electrode and a positive electrode tab formed on the positive electrode, and
 in the stacking step (S1), each of the negative electrode, the separator, and the positive electrodes is provided in plurality, and the plurality of negative electrodes, the plurality of separators, and the plurality of positive electrodes are stacked, wherein the positive electrode tabs of plurality of the positive electrodes are disposed on the same vertical line, and the negative electrode tabs of the plurality of negative electrodes are disposed to be gradually close to the positive electrode tabs in a stacked direction of the negative electrodes.

8. The method of claim 7, wherein, in the stacking step (S1), the positive electrode tabs formed on the plurality of positive electrodes are stacked on each other, and
 in the electrode tab coupling step (S2), the positive electrode tabs are coupled to each other, and the negative electrode tabs are not coupled to each other.

9. The method of claim 8, wherein the plurality of negative electrode tabs, which are disposed to be spaced apart from each other, are disposed to overlap each other on the same vertical line after being wound in the winding step (S3).

10. The method of claim 9, wherein, in the winding step (S3), the electrode stack is wound so that the negative electrode on which the negative electrode tab that is close to the positive electrode tab is formed is disposed at the inside in the wound direction of the electrode stack.

11. The method of claim 10, wherein, in the winding step (S3), the plurality of negative electrode tabs are stacked to overlap each other on the same vertical line.

12. The method of claim 11, wherein, after the winding step (S3), the negative electrode tabs respectively formed on the plurality of negative electrodes are stacked to be coupled to each other.

13. The method of claim 12, wherein ends of the negative electrode tabs that are stacked to be coupled to each other are bent in a central direction of the electrode stack.

14. The method of claim 8, wherein the plurality of negative electrode tabs spaced apart from each other are disposed at the same distance with respect to a central axis of the electrode stack wound in the winding step (S3),
 in the winding step (S3), the negative electrode tabs respectively formed on the plurality of negative electrodes are disposed at the same distance with respect to the central axis of the wound electrode stack, and
 after the winding step (S3), the negative electrode tab is bent in a central direction of the wound electrode stack, and ends of the bent negative electrode tab are stacked to be coupled to each other.

15. An electrode assembly comprising:
- an electrode-assembled body in which a positive electrode, a separator, and a negative electrode are repeatedly stacked and wound; and
- an electrode tab bundle in which electrode tabs having at least one same polarity of electrode tabs of the negative electrode and electrode tabs of the positive electrode, which are stacked in the electrode-assembled body, are bent in a radial direction of the electrode-assembled body and coupled to each other along a central axis of the electrode-assembled body.

16. The electrode assembly of claim 15, wherein the electrode tab bundle comprises one or more electrode tab bundles of a negative electrode tab bundle in which negative electrode tabs disposed on a plurality of negative electrodes stacked in the electrode-assembled body are stacked to be coupled to each other and a positive electrode tab bundle in which positive electrode tabs disposed on a plurality of positive electrodes stacked in the electrode-assembled body are stacked to be coupled to each other.

17. The electrode assembly of claim 15, wherein the electrode tab bundle comprises:
- a negative electrode tab bundle in which negative electrode tabs disposed on a plurality of negative electrodes stacked in the electrode-assembled body are bent in a central direction of the electrode-assembled body and coupled to each other; and
- a positive electrode tab bundle in which positive electrode tabs disposed on a plurality of positive electrodes stacked in the electrode-assembled body are stacked to be coupled to each other.

18. The electrode assembly of claim 17, wherein the negative electrode tabs disposed on the plurality of negative electrodes are spaced the same distance from each other in the state in which the electrode-assembled body is wound.

19. The electrode assembly of claim 15, wherein the electrode tabs of the plurality of positive electrodes stacked in the electrode-assembled body are disposed on the same vertical line,
- the electrode tabs of the plurality of negative electrodes stacked in the electrode-assembled body are gradually close to the electrode tabs of the positive electrodes in a stacked direction of the plurality of negative electrodes, and
- ends of the electrode tab of each of the negative electrodes are bent to overlap each other at a central portion of the electrode-assembled body.

20. The electrode assembly of claim 19, further comprising a positive electrode tab bundle in which the electrode tabs of the plurality of positive electrode stacked on the same vertical line in the electrode-assembled body are stacked to be coupled to each other.

* * * * *